Patented Aug. 20, 1935

2,011,915

UNITED STATES PATENT OFFICE 2,011,915

FRICTION FACING MATERIAL

William R. Seigle, Mamaroneck, N. Y., assignor to Johns-Manville Corporation, New York, N. Y., a corporation of New York No Drawing. Application November 28, 1930, Serial No. 498,761

6 Claims. (Cl. 92—21)

The present invention relates to a composition of matter formed from fibrous material and rubber emulsions or dispersions and particularly to compositions of this character adapted for use as friction facing material, and to an improved method of manufacturing such compositions.

Heretofore, friction facing material such as brake lining and the like to which my invention is particularly directed has been produced from asbestos fibers and binding materials such as asphaltum, rubber, etc. by various methods all of which are subject to certain disadvantages which are obviated by my invention. Some of the methods in wide-spread use involve the introduction of the binder by saturation or impregnation into the asbestos in woven or felted form. In practice it has been found to be a difficult problem to secure satisfactory impregnation and furthermore such methods are costly due to the necessity of using long fiber asbestos and expensive solvents as carriers for the impregnating agents. In other methods of producing friction facing material the fibrous material, binders, and solvents are admixed directly, thereby forming a sticky plastic mass which is thereafter molded. This method is likewise subject to technical disadvantages resulting from the difficulties of securing a satisfactory distribution of the fibrous material in the binder and of handling masses of sticky material.

The principal object of my invention is to provide a method of manufacturing friction facing material which is free of the disadvantages characterizing the methods used heretofore, particularly by obviating the necessity of handling masses of sticky material and the use of costly solvents.

A further object of my invention is the provision of a composition in which a more efficient and uniform distribution of the fibrous and binding material is obtained and one having a high degree of strength, and the friction and wearing qualities requisite in friction facings and similar materials.

Various other objects and advantages of my invention will appear as the description thereof proceeds.

My invention involves the formation of a mixture of a reinforcing material, particularly fibrous material, such as asbestos, and a rubber emulsion, the admixture being of sufficiently dilute concentration that it may be filtered, and thereafter forming the admixture by filtering, preferably under pressure, into non-laminated sheets or slabs. In the production of my improved composition, I preferably incorporate various other materials adapted to augment its resistance to wear and impart other qualities, such as strength and a high coefficient of friction, which are generally desirable in friction facing materials. The product thus formed is preferably subjected to a vulcanizing process to convert it into a dense strong material particularly adapted for use as friction facings.

Further features and advantages of my invention will be apparent from the following detailed description thereof.

The rubber emulsions or dispersions employed may be produced by any one of a variety of known methods; for example, those described in the following patents are generally suitable:— 1,513,139, Trumbull et al.; 1,609,308, Pratt; 1,621,468, Pratt; Trumbull 1,668,879; 1,671,314, Pratt; 1,671,316, Richards et al. These emulsions ordinarily have ingredients other than rubber such as fillers, sulphur, etc., in varying amounts which render them vulcanizable and enhance the strength and other desirable properties of the final product and such composite, vulcanizable materials are hereinafter designated as rubber emulsion compounds. An illustrative example of the composition of emulsions which have been used to advantage according to my invention is as follows:—

Formula of dispersion

| | Per cent |
|---|---|
| Rubber | 45.86 |
| Zinc oxide | 5.34 |
| Softener (tackol) | 2.61 |
| Wilkinite clay (emulsifying agent) | 11.88 |
| Sulphur | 22.93 |
| Litharge | 11.38 |

Dispersed rubber compound

| | Per cent |
|---|---|
| Solids | 38 |
| Water | 62 |

Asbestos fibers are preferably employed as the fibrous material incorporated with the rubber emulsion according to the invention, and such fibers may vary considerably in length and quality. One of the advantages of my invention resides in the fact that short length fibers which are not suitable for forming woven friction materials may be utilized. In some cases non-fibrous material, as for example, finely divided incombustible material such as "Asbestine", may be used. Although asbestos constitutes the preferred fibrous material, particularly when the composition is to be used for friction facings, for some purposes various other fibers, including either vegetable fibers such as cotton, or animal fibers such as wool, or mineral fibers such as rock wool, may be employed together with or in place of asbestos.

A wide variety of modifying ingredients may be incorporated in the mixture of rubber emulsion and reinforcing material for the purpose of altering the properties of the final product to especially adapt it for particular purposes. In the case of friction facing materials a number of materials have been found to have beneficial effects when incorporated together with the usual mixture of binder and fibrous material. Certain of these materials serve to augment the friction properties by increasing the coefficient of friction, or to modify the material in such a manner that undue "grabbing" of the friction surfaces during operation does not occur. Others serve to increase the strength and wear-resistant qualities. Among such wear and friction augmenting substances I have found that the following materials have particularly beneficial effect when incorporated either alone or in combination with each other: Solid particles such as particles of metal in the form of chips, filings, or dust of lead, eutectic lead-tin alloys, zinc, brass, and iron, gilsonite, asphaltum as such or in emulsion form, copal gum, Portland cement, graphite, carbon black, drying oils such as linseed oil and China-wood oil, and sulfonated oils. Such substances may be designated generically as friction and wear-resistant augmenting substances.

In making the product, an intimate admixture is first formed of the rubber emulsion and asbestos or like material in any suitable type of mixing equipment adapted to thoroughly open the fiber and mix the other ingredients therewith. The asbestos is mixed with water and then agitated until the fibers are thoroughly distributed throughout the mass. The mixer tends to draw out and disintegrate the fibers so that the mixture gradually becomes of thicker consistency and further additions of water are then made to maintain the fluidity of the mixture. The rubber emulsion compound in requisite amount is then introduced into the fibers and thoroughly admixed therewith. The emulsion readily permeates between the fibers and a very intimate association of the fibers and rubber is thus attained. Other materials adapted to modify advantageously the properties of the final product are preferably incorporated into the admixture in the mixing operation, particularly substances adapted to augment the friction and wearing properties, as before mentioned. The introduction of modifying materials at this stage constitutes one of the important advantages of the invention over the methods available heretofore. The water content of the admixture may vary considerably, but is maintained sufficiently high to permit the ingredients to be thoroughly incorporated and provide a filterable mixture. In general the water content should ordinarily constitute about 60 per cent to 80 per cent of the total mixture.

For fabricating the admixture into sheets or slabs, a hydraulic filtration press of a conventional type may be used. One type of press which has been employed to advantage comprised a bed-plate having a recess therein for containing the aqueous admixture, and a die member adapted to coact with the recess so as to apply a high pressure to the admixture and force its water content through a filtering medium forming the bottom of the recess, as, for example, a fine mesh wire cloth. The bed-plate member and die are preferably secured to vertical columns, either the die or bed-plate being movable so that the requisite co-action of these elements may be brought about. The recess is made in the form and dimensions of the sheet or other shape desired, and preferably of a fairly large area, e. g., about 32 square feet, and deep enough to hold a sufficient amount of the aqueous admixture to provide a sheet of the desired thickness.

The aqueous admixture is introduced into the press, and the die and bed-plate are then brought together, thereby placing the admixture under a pressure sufficiently high to produce a product of the requisite density, and causing its water content to separate by passage through the filtering medium and the dispersed rubber to separate with the fibers in the form of an intimate mixture of asbestos fibers and coalesced rubber. Sheets thus formed contain a residual amount of water which may be evaporated, preferably by first air-drying for about twelve hours and then drying in an oven for a suitable period at a temperature of about 125 to 150 degrees F.

The products thus produced have a non-laminated structure, and consequently, no planes of structural weakness and the fibers, while uniformly distributed in the rubber are heterogeneously arranged and extend more or less in all directions within the mass so that the product is of fairly uniform tensile strength in all directions.

In the production of friction facing material, the filtered product is severed or stamped into suitable shapes for clutch facing or brake lining elements. These elements are then vulcanized at a suitable pressure and temperature, as, for instance, between steam heated platens, at a temperature of about 150 degrees C., and pressure of about 132 lbs. per square inch. The vulcanized material has been found to constitute a highly efficient friction facing having ordinarily a Brinell hardness of over 15, and a tensile strength in excess of 2000 lbs. per square inch. The product is particularly characterized by the homogeneity of its composition, and the resultant uniformity in its properties.

The composition of my product may be varied considerably, as has been indicated above, and is further illustrated by the following group of formulæ which have been used to good advantage:—

|  | % | % | % | % | % | % |
|---|---|---|---|---|---|---|
| Dispersed rubber comp. | 36 | 33½ | 32 | 38 | 35 | 32 |
| Asbestos fibers | 57 | 33½ | 52 | 30 | 50 | 32 |
| Lead dust | 7 |  |  |  |  |  |
| Eutectic lead alloys |  | 33½ |  |  |  |  |
| Asphaltum |  |  | 16 | 10 | 10 |  |
| Gilsonite |  |  |  | 12 |  | 8 |
| Graphite |  |  |  | 10 |  |  |
| Carbon black |  |  |  |  | 5 | 8 |

In the above table, the percentages are calculated to a dry basis.

In these compositions, the lead containing materials serve principally to increase the wear-resistant properties particularly by reducing the tendency of the friction material to scour during use; carbon black also increases the wear-resistant properties and acts as a coloring agent; graphite serves as a lubricant and prevents "grabbing"; asphaltum, gilsonite, copal, and like materials serve as binders and also have a desirable modifying effect on the friction properties.

What I claim is:

1. A method of manufacturing slabs or sheets adapted for use as friction facing material, which comprises forming a filterable mixture of asbestos fibers, a colloidal rubber emulsion, and a friction-augmenting material, and filtering a sufficient quantity of said mixture through a filtering medium to form a non-laminated sheet or slab of suitable thickness for use as friction facing material, said sheet having the fibers extending throughout the mass in a heterogeneous arrangement.

2. A method of manufacturing slabs or sheets adapted for use of friction facing material, which comprises forming a filterable mixture of asbestos fibers, a rubber emulsion compound, and a friction-augmenting material, filtering a sufficient quantity of said mixture through a filtering medium to form a non-laminated sheet or slab of suitable thickness for use as friction facing material said sheet having the fibers extending throughout the mass in a heterogeneous arrangement, and vulcanizing said sheet.

3. Non-laminated slab or sheet material adapted for use as friction facings such as brake lining, comprising asbestos fibers intimately associated with coalesced rubber, and a friction-augmenting material.

4. Non-laminated slab or sheet material adapted for use as friction facings such as brake lining, comprising asbestos fibers intimately associated with coalesced rubber, and a friction-augmenting material comprising particles of a lead-containing material.

5. Non-laminated slab or sheet material adapted for use as friction facings such as brake lining, comprising asbestos fibers intimately associated with coalesced rubber, and a friction-augmenting material comprising a drying oil.

6. Non-laminated slab or sheet material adapted for use as friction facings such as brake lining, comprising asbestos fibers intimately associated with coalesced rubber, and a friction-augmenting material comprising copal gum.

WILLIAM R. SEIGLE.